United States Patent
Carnahan

(10) Patent No.: US 8,151,282 B2
(45) Date of Patent: Apr. 3, 2012

(54) SYSTEM AND METHOD FOR PIPELET PROCESSING OF DATA SETS

(75) Inventor: John M. Carnahan, Redondo Beach, CA (US)

(73) Assignee: Yahoo! Inc., Sunnyvale, CA (US)

(*) Notice: Subject to any disclaimer, the term of this patent is extended or adjusted under 35 U.S.C. 154(b) by 1461 days.

(21) Appl. No.: 11/406,069

(22) Filed: Apr. 17, 2006

(65) Prior Publication Data
US 2007/0011437 A1      Jan. 11, 2007

Related U.S. Application Data

(60) Provisional application No. 60/671,642, filed on Apr. 15, 2005, provisional application No. 60/671,569, filed on Apr. 15, 2005.

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. .................................... 719/328
(58) Field of Classification Search ............ 719/328
  See application file for complete search history.

(56) References Cited

U.S. PATENT DOCUMENTS

| | | | |
|---|---|---|---|
| 6,550,057 B1* | 4/2003 | Bowman-Amuah | 717/126 |
| 7,290,048 B1* | 10/2007 | Barnett et al. | 709/223 |
| 7,526,770 B2* | 4/2009 | Snover | 719/315 |
| 7,529,764 B2* | 5/2009 | Gutsche | 1/1 |
| 7,659,901 B2* | 2/2010 | Toelle et al. | 345/506 |
| 2002/0138659 A1* | 9/2002 | Trabaris et al. | 709/313 |
| 2004/0186915 A1* | 9/2004 | Blaszczak et al. | 709/246 |

OTHER PUBLICATIONS

Rex et al., "The LONI Pipeline Processing Environment", Mar. 2003, Elsevier Science (USA), NeuroImage 19 (2003), pp. 1033-1048.*
Pfeiffer et al., "Applying Model Checking to Workflow Verification", Jul. 26, 2004, IEEE, Proceedings of the 11th IEEE international Conference and Workshop on the Engineering of Computer-Based Systems (ECBS '04), pp. 144-151.*

* cited by examiner

*Primary Examiner* — Emerson Puente
*Assistant Examiner* — Kimbleann C. Verdi
(74) *Attorney, Agent, or Firm* — Seth H. Ostrow; Ostrow Kaufman LLP

(57) ABSTRACT

The present invention is directed towards systems and methods for decomposing a complex problem or task into one or more constituent components, operating in parallel over a plurality of computing devices in communication over a network. A system according to the present invention comprises one or more pipelets. A given pipelet comprises a read data interface operative to receive incoming data, one or more functions for processing the incoming data, and a write data interface operative to make the processed incoming data available as output data to be further processed. The system according to the present embodiment further comprises a controller operative to receive a pipeline specification that identifies the one or more pipelets as belonging to a pipeline, generate a dependency map that identifies an order in which to execute the one or more pipelets and execute the pipelets according to the dependency map to generate a result.

25 Claims, 8 Drawing Sheets

```
⋮

230
      ┌─<process id="raw.p"    type="demultiplexer">
223 ──┤   <input     name="document"      label="docData"/>
      │   <input     name="meta"          label="metaData"/>
   224┤   <output    name="html"          label="htmlRaw"/>
      │   <output    name="pdf"           label="pdfRaw"/>
226 ──┤   <param     name="demux">html,pdf</param>
      └─</process>
                              228
      ┌─<process id="chunks.p"        type="multiplexer">
232 ──┤   <input     name="html"          label="htmlChunks"/>
      │   <input     name="pdf"           label="pdfChunks"/>
   234─── <output    name="result"        label="chunks"/>
          <param     name="mux">html,pdf</param>
236 ── </process>
       <process id="contexts.p"       type="multiplexer">
          <input     name="html"          label="htmlContext"/>
          <input     name="pdf"           label="pdfContext"/>
          <output    name="result"        label="context"/>
          <param     name="mux">html,pdf</param>
       </process>
       <process id="propernouns.p"    type="properNounExtractor">
          <input     name="document"      label="chunks"/>
          <output    name="result"        label="properNouns"/>
       </process>
       <process id="persons.p"        type="personClassifier">
          <input     name="document"      label="properNouns"/>
          <input     name="context"       label="context"/>
          <output    name="result"        label="persons"/>
       </process>
     </pipeline>

SYSTEM AND METHOD FOR PIPELET PROCESSING OF DATA SETS

The present application claims the benefit of U.S. Provisional Patent Application No. 60/671,569, entitled "DISTRIBUTED COMPUTATION FRAMEWORK THE PIPELET APPLICATION PROGRAMMING INTERFACE," filed on Apr. 15, 2005, and U.S. Provisional Patent Application No. 60/671,642, entitled "DISTRIBUTED COMPUTATION FRAMEWORK THE PIPELET APPLICATION PROGRAMMING INTERFACE," filed on Apr. 15, 2005, the disclosures of which are hereby incorporated by reference herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to processing one or more items of data. More specifically, the present invention is directed to facilitating the distribution and execution of one or more functional components, the inputs and outputs of which are distributed across one or more computing devices interconnected by a network and dynamically coupled to form a data processing pipeline.

BACKGROUND OF THE INVENTION

A pipeline is a software infrastructure that defines and links one or more stages of a process, such as a complex business or processing problem. The stages of the pipeline are run in sequence to complete a specific task whereby the output of a given stage is serially provided as input to a subsequent stage, at which point the given stage fetches a subsequent data item to process while the subsequent stage is executing. The stages into which a given pipeline is divided provide processing for the incoming data according to the data processing functions that a given stage is operative to execute, as well as determining the sequence in which processing occurs on the data entering the pipeline to generate an end result. Although a given stage of a pipeline may be local or remote to other stages in the pipeline, the relationship between the stages is static and data must flow through all stages in the pipeline.

One advantage of using a pipeline for data processing is that once all stages in the pipeline are loaded, an end result of the processing or output of the pipeline is produced every cycle. For example, where processing stages A, B and C are connected in a pipeline, and each stage takes one minute to complete, the end result of the pipeline is produced once a minute after all stages are loaded with data, as opposed to once every three minutes where the stages are not connected in a pipeline. A software pipeline may be compared to a manufacturing assembly line in which different parts of a product are being assembled at the same time although ultimately there may be some parts that have to be assembled before others are. Even where some sequential dependency exists, the pipeline takes advantage of those operations that proceed concurrently.

Many disparate techniques for processing software pipelines are known to those of skill in the art. For example, the map-reduce programming model is an attempt to reduce the complexity of the distributed computation of a problem into smaller functional components that can be easily developed. The map-reduce model is a way of expressing the demultiplexing and multiplexing of operational pairs (i.e., map and reduce) so as to automatically allow processing of data to be partitioned among a cluster of computing resources.

One advantage of map-reduce is that it allows for the easy development of a distributed computations task. The model, however, suffers from a number of problems. For example, map-reduce handles parallelization at the level of each map-reduce pair, which is only sufficient for simple tasks and becomes problematic for more complex tasks in information retrieval and machine learning, e.g., focused crawling, ngram generation, etc. In order to accomplish complex tasks such as these, the model requires a priori knowledge regarding how to parallelize the task as a whole, including which mapped pairs should be serial and which should be parallel due to the static nature of the mapping and reduction. Map-reduce also fails to provide higher order language constructs for achieving complex processing, such as looping and conditional constructs, due to the static nature of the map-reduction pairs. Furthermore, the map-reduce model neither provides sufficient extensibility for developing a body of reusable components for data processing nor a mechanism for cooperation between map-reduce pairs.

Another technique, messaging system frameworks, provides the ability to perform distributed computation using loosely coupled asynchronous computations units. One disadvantage of using messaging system frameworks for pipeline processing of data, however, is that these systems do not provide a means to declare groups of components that cooperate for a single task—there is no contractual agreement established between messaging components linking the components together. Also, messaging system frameworks do not provide interfaces for handling the receipt and transmission of data from and to multiple sources and destinations.

Another alternative for pipeline data processing known to those of skill in the art is the use of workflow engines. Applications such as these use standardized languages, such as Business Process Execution Language ("BPEL"), to describe processes in terms of workflow between interconnected computational units. In addition to other limitations, however, none of these languages or implementations are suited for describing distributed computational processes.

In addition to other drawbacks, the alternatives for pipeline data processing known to those of skill in the art fail to provide memoization, parallelization of execution, optimization of process distribution and asynchronous processing in a service oriented framework. Thus, there is a need for new systems and methods for allowing the declaration and execution of data processing pipelines that overcome limitations with existing techniques.

SUMMARY OF THE INVENTION

The present invention is directed towards systems and methods for decomposing a complex problem or task into one or more constituent components, e.g., pipelets, each of which may perform a portion of the problem or task, which may be performed in parallel and distributed over a plurality of computing devices in communication over a network. According to one embodiment, a system according to the present invention comprises one or more pipelets. A given pipelet comprises a read data interface operative to receive incoming data, one or more functions for processing the incoming data, and a write data interface operative to make the processed incoming data available as output data to be further processed. The system according to the present embodiment further comprises a controller operative to receive a pipeline specification that identifies the one or more pipelets as belonging to a pipeline, generate a dependency map that identifies an order in which to execute the one or more pipelets and execute the pipelets according to the dependency map to generate a result. The system may also comprise a persistence processor operative to store the processed incoming data from one or more pipelets.

The read data interface of a given pipelet may be addressable for targeting by the controller or some external entity, such as an application or web service. The address for a given read data interface may be a URL, a URI, etc. Similarly, the write data interface of a given pipelet may be addressable for targeting by the controller or some external entity. The address for a given write data interface may be a URL, a URI, etc.

A given pipelet in a give pipeline may process data both synchronously and asynchronously, as well as in parallel. One or more pipelets may be arranged or organized into a pipeline to complete a task that is larger than a task performed by a given on of the one or more pipelets, whereby a given pipelet is operative to solve a sub-task of a larger task, e.g., a step in a pipeline. The arrangement of the pipelets in a pipeline may be arbitrary in order to provide flexibility to solve any given problem. Accordingly, a given pipelet may be operative to provide processed incoming data to a plurality of subsequent pipelets. Similarly, a given one of the plurality of subsequent pipelets may be operative to provide processed incoming data to the given pipelet. The one or more pipelets in a pipeline may process incoming data in parallel, and the processing speed of a given pipelet is limited by a rate at which incoming data is received by the read data interface of the given pipelet.

A pipeline comprising one or more pipelets may be exposed as a service that may be invoked by one or more external applications, which may be web services or one or more other software applications. Application may address a given pipelet by reference to an address, which may be a Uniform Resource Locator ("URL"), Uniform Resource Identifier ("URI"), or other identifier.

The one or more pipelets may also be distributed across one or more pipelet processing resources in communication with the controller over a network. According to one embodiment, the controller determines an appropriate pipelet processing resource at which to execute a given pipelet, which may be one of any number of computing resources including, but not limited to, a desktop computer, a server class computer, a PDA, etc. The controller is also operative to cache the processed incoming data from a given pipelet, as well as to select a given pipelet at which to being processing of a pipeline, e.g., in response to a request from an application or web service to execute a target pipelet. The controller may also facilitate the execution of multiple pipelines in parallel, wherein the output of a first pipeline serves as the input to a second pipeline. A given pipelet may be included as part of multiple pipelines, such as a first pipeline and a second pipeline.

The present invention provides a framework for pipelet processing according to one or more pipelines. A pipeline may be directed to processing any number of data processing tasks that take advantage of distributed, parallel pipeline processing of data including, but not limited to focused crawling over a corpus of documents and machine learning based on a corpus of documents.

BRIEF DESCRIPTION OF THE DRAWINGS

The invention is illustrated in the figures of the accompanying drawings, which are meant to be exemplary and not limiting, in which like references are intended to refer to like or corresponding parts, and in which:

FIGS. 2A and 2B present a configuration file illustrating a pipeline processing specification according to one embodiment of the invention;

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
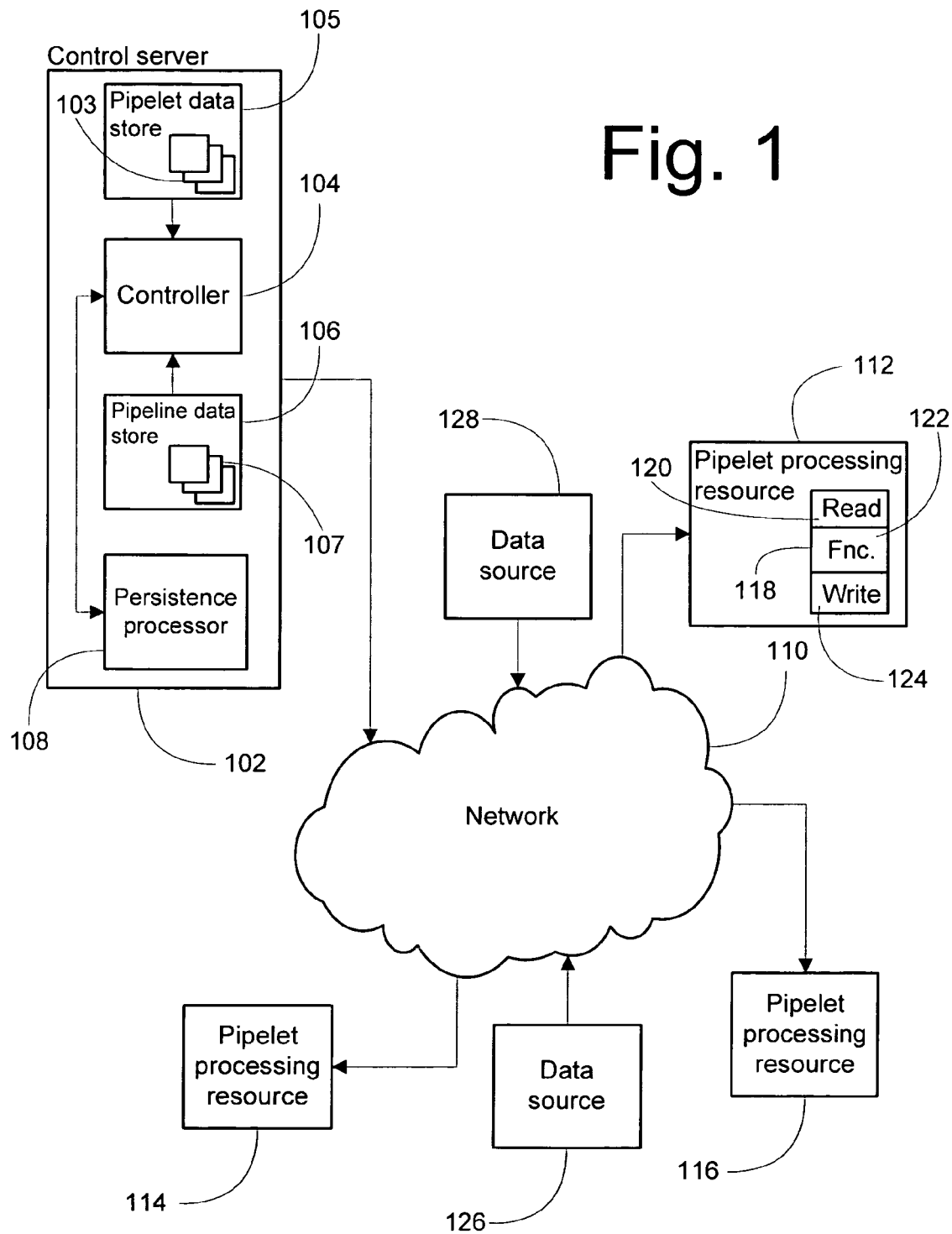
FIG. 1 is a block diagram illustrating a system for providing a pipelet processing framework for the creation and execution of data processing pipelines according to one embodiment of the present invention.

FIG. 1 presents a block diagram illustrating an embodiment of a system providing a framework for the creation and execution of data processing pipelines comprising one or more pipelets. According to the embodiment illustrated at FIG. 1, the framework comprises a control server 102, one or more pipelet processing resources 112, 114 and 116, as well as one or more data sources 126 and 128. The processing of data within the present framework is orchestrated by components residing at the control server 102. The control server 102 comprises a controller 104, a pipelet data store 105, a pipeline data store 106 and a persistence processor 108. It should be understood that these components may reside locally to one another on a single computing resource, reside remote to one another on a plurality of computing resources interconnected by a network 110, as well as combinations thereof.

A pipelet according to one embodiment is a software component that comprises a read data interface operative to receive incoming data, one or more functions for processing the incoming data, and a write data interface operative to make the processed incoming data available for further processing by other local or remote pipelets. Both the read and write data interfaces of a given pipelet may be identified by a signature, which may be a unique signature, and allow an external entity, such as a controller 104, to determine the input data that a pipelet expects in addition to the processed incoming data (e.g., output) that a pipelet produces. A given pipelet is essentially a stream processor that receives a data stream over its read data interface, which is processed by one or more functions comprising the pipelet and streamed out over its write data interface for receipt by the read data interface of a subsequent pipelet.

A given pipelet is also a self-contained processing unit that is not provided with awareness of other pipelets from which it receives data or to which it transmits data. A plurality of pipelets are arranged in a pipeline to conduct processing of a task. The plurality of pipelets receive incoming data, which may be received from a prior or subsequent pipelet, process the incoming data and make the processed incoming data available to a prior or subsequent pipelet where there are additional pipelets in the pipeline configured to receive the processed incoming data for further processing. Because a pipelet is a self-contained processing unit, the framework provides flexibility in allowing pipelets to be reused in multiple pipelines as well as reordered and rearranged within a given pipeline.

The framework of the present invention also provides an application program interface ("API") for authoring individual pipelets. The API provides the stream interfaces for writing data to and reading data from pipelets in a pipeline. The API further provides an intuitive interface for dealing with large amounts of data by breaking down complex problems into smaller units, e.g., pipelets. This allows pipelet authors to exploit hardware resource and decreases the amount of time required to process large amounts of data. According to one embodiment, the API is a superset of the Java Servlet API promulgated by Sun Microsystems. The API may also include a service provider interface ("SPI"), which is a software mechanism for supporting replaceable components, thereby extending the capabilities of pipelets.

The pipeline data store 106 is operative to maintain one or more pipeline specifications 107, a given pipeline specification identifying one or more pipelets belonging to the given pipeline. Essentially the pipeline specifications 107 in the pipeline data store 106 are data files that identify the input and output "signatures" for the pipelets in a given pipeline. For example, a pipeline specification may identify pipelets A, B and C as belonging to the pipeline, as well as the data that a given pipelet is operative to receive and the data that the given pipelet is operative to output. According to one embodiment of the invention, a pipeline specification 107 may implement the W3 Consortium's XML Pipeline Definition Language ("XPDL"), which is hereby incorporated by reference in its entirety, to identify the pipelets comprising a given pipeline, as well as the input and output signatures of the pipelets.

The pipelets 103 identified by a given pipeline specification 107 comprise input and output signatures, which may be URLs defined as URIs within the XML Base of the pipeline specification 107. This allows for targeted requests to a given pipeline, thereby allowing an external entity to exercise only those portions of a given pipeline necessary to achieve a desired result. Accordingly, a URL may be used as a target of a request to a pipeline whereby the pipeline may be viewed as a set of services defined by targets that can be requested by an external entity.

The controller 104 uses the information in a given pipeline specification 107 to determine the pipelets 103 to instantiate, where to instantiate the determined pipelets 103, as well as control the flow of data between the instantiated pipelets 103. The controller 104 may receive a request from an external entity (not pictured), which may be a software application, service, process, etc. for execution of a given target, which may be an output signature for a given pipelet, in addition to a pipeline specification 107 to which the pipelet 103 belongs. An external entity may alternatively pass the controller 104 a request to execute an entire pipeline identified by a pipeline specification 107.

Upon receipt of the request, the controller 104 retrieves the appropriate pipeline specification 107 from the pipeline data store 106 and locates the target of the request in the pipeline specification 107. Given the target pipelet 103 in the retrieved pipeline specification 107, the controller 104 builds a dependency graph to determine the pipelets upon which the target pipelet depends. On the basis of the pipeline specification 107 and the dependency graph, the controller 104 also determines the optimal manner in which to organize, instantiate and distribute the pipelets 118 over a network 110 for execution on one or more pipelet processing resources 112, 114 and 116 so as to maximize the flow of data between the instantiated pipelets 118 in a given pipeline. As discussed above, the use of pipelets 103 allows for only a portion of a pipeline to be exercised on the basis of the target that an external entity requests. Accordingly, the controller 104 may instantiate only those pipelets 118 in a pipeline necessary for execution of a task request from an external entity.

The controller 104 may also provide the means by which each instantiated pipelet 118 may marshal outputs and unmarshal inputs, which may include adapting messages between pipelets 118, seen as inputs and outputs, into a form that may be utilized by the pipelets 118 in a given pipeline. Furthermore, the controller 104 is responsible for relaying messages between pipelets 118 in a pipeline, including invoking methods on objects, message passing mechanisms and arguments to stand-alone command-line executables. Although the present framework does not require any specific message syntax or content to connect the inputs and outputs of the pipelets 118 in a pipeline, according to one embodiment the message contains meta information such as intermediary outputs, cache status of the target output and the data generated by intermediary pipelets.

Using the dependency graph and pipeline specification 107, the controller 104 determines the appropriate pipelet processing resources 112, 114 and 116 to utilize for execution of the target pipelet and pipelets upon which the target pipelet depends. The controller retrieves the pipelets 103 from the pipelet data store 105 for instantiation on the pipelet processing resources 112, 114 and 116. A pipelet 118 is instantiated for execution on a pipelet processing resource 112 including a read data interface 120 for the receipt of incoming data, one or more functions 122 for processing the incoming data and a write data interface 124 for making the processed incoming data available to other pipelets in a pipeline as determined by the controller 104, which may be a subsequent pipelet or a prior pipelet, depending on the flow control structures indicated in the pipeline specification 107 that the controller 104 is utilizing. Where the pipelets 103 in the pipelet data store 105 are written in Java as classes, the controller 104 instantiates a given pipelet 118 as an object for execution by a Java Virtual Machine (not pictured) executing on a pipelet processing resource that the controller 104 selects.

The one or more pipelets 103 identified for execution in a pipeline specification 107, which the controller instantiates on one or more pipelet processing resources 112, 114 and 116 in communication over a network 110, receive an initial input of one or more data items for processing by the pipelets 118 in the pipeline 107. An initial pipelet in a given pipeline retrieves the one or more data items for processing from one or more data sources 126 and 128. Additionally, the final pipelet in a given pipeline may store the pipeline output on one or more data stores 126 and 128. Alternatively, the pipeline output may be passed to an external entity, such as a software application, process, service, etc., which initially instructed the controller 104 to exercise the pipeline in whole or in part.

The controller 104 may make use of data caching to store the output of a given pipelet during the execution of a pipeline, which other pipelets in the pipeline may utilize, e.g., when executing recursion or other loops. The pipeline specification 107 may indicate whether or not to cache the output of a given pipelet, e.g., through the use of a cachetype directive in the pipeline specification 107 selected from a defined set of cache types, as well as include a cache identifier that instructs the controller 104 as to the proper pool into which it should place the output of a given pipelet. A pipeline specification 107 may also instruct the controller 108 regarding the resource limits for a given pipelet and how to cache outputs.

The system may further comprise a persistence processor 108 operative to conditionally store output of a pipeline subsequent to executing the pipeline. According to one embodiment, the persistence processor 108 is a special pipelet that may receive data from an ancestor pipelet in a pipeline, but may not be directly addressed by an external entity as a target. Instead, the persistence processor 108 stores the data of its dependent ancestor in the pipeline, causing the controller 104 to execute a process when it is not directly in the path of a request. The persistence processor 108 may also override the execution of its ancestor if the data that the ancestor generates is the same as the persisted copy, replacing the output dynamically. According to one embodiment, the persistence processor 108 requires information regarding whether the output to be persisted was recently generated or retrieved from a cache, which an output from a pipelet may indicate by setting an attribute flag in the output. The persisted data is available for use in processing according to the pipeline from which the data is persisted, in addition to other pipelines that the controller 104 executes.

Figure 2A:
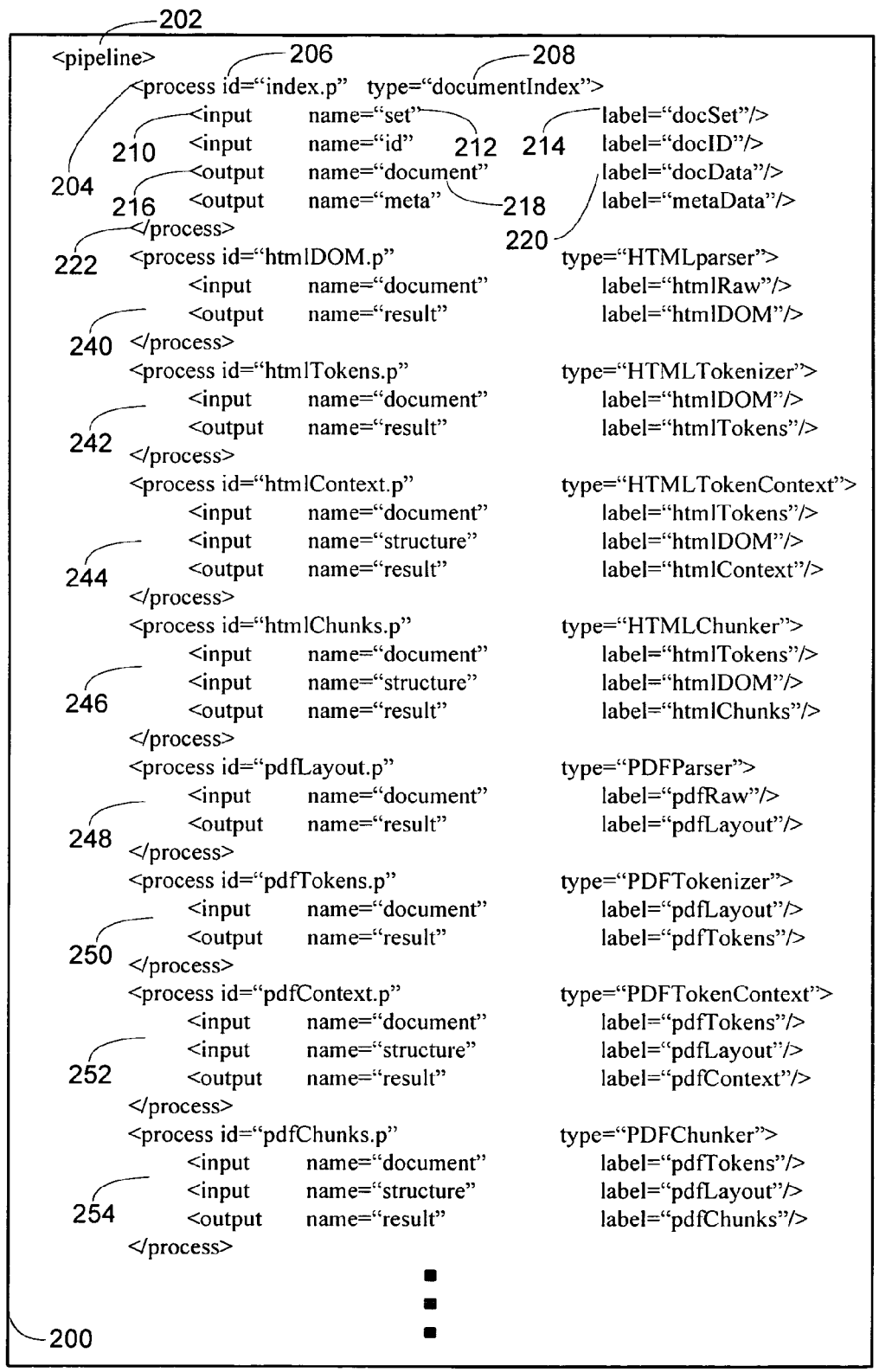

A discussed above, a pipeline specification identifies one or more pipelets comprising a given pipeline. FIG. 2A illustrates a pipeline specification according to one embodiment of the invention. According to the pipeline specification of FIG. 2A, the pipeline specification 200 begins with a "<pipeline>" tag 202, instructing the controller that the document is identifying the pipelets that comprise a given pipeline. The pipeline specification itself comprises one or more processes 204, 240, 242, 244, 246, 248, 250, 252 and 254, each process identifying a given pipelet in the pipeline.

A given process 204 comprises data indicating an identifier for the process 206, e.g., a pipelet name, and a description or type for the process 208, e.g., a pipelet description. The process identifier 206 and description 208 are parameters to the process tag 204 indicating the definition of a new pipelet in the pipeline. A given process 204 also comprises one or more input tags 210, indicating the input signature of the pipelet. A given input tag 210 may comprise a name attribute 212, which provides a name for the input, as well as a label 214, which provides a description of the input 210. The input tags for a given process indicate the input signature for a given pipelet. A given process may also comprise one or more output tags 216, indicating the output signature of the pipelet. A given output tag 216 may comprise a name attribute 218, which provides a name for the output, as well as a label 220, which that provides a description of the output. Similarly to an input tag 210, an output tag 216 for a given process indicates the output signature for a given pipelet. The process ends with a close process tag 222, indicating to the controller that the definition of the process is complete.

Each of the processes 204, 240, 242, 244, 246, 248, 250, 252 and 254 in the pipeline 202 contains an input and output signature indicating the data that a given pipelet expects to receive and the output the pipelet provides, respectively. The controller may use the pipeline specification 200 to determine the flow of data to and from any given pipelet. As should be understood by those of skill in the art, these input and output signatures represent a data contract between pipelets that determines the flow of data through the pipeline 202. Similarly, when the controller is provided with a given target, e.g., pipelet or process in a pipeline specification, the controller uses the input and output signatures of the pipelets n the pipeline specification 202 to determine the dependencies of the target, exercising only the portion of the pipeline necessary to receive the processed output data from the desired target.

The pipeline specification of FIG. 2A continues with FIG. 2B, which indicates several processes that provide for the implementation of multiplexing and demultiplexing operations in a pipeline, e.g., branching and consolidation. According to FIG. 2B, a demultiplexing pipelet is identified as a process 223 comprising two input tags 224 and two output tags 226. Accordingly, the signatures for the pipelet indicate that it receives two data items as inputs (document data and metadata), and provides two distinct outputs (raw html or pdf data), thereby splitting or demultiplexing the pipeline into two separate branches. The present pipeline specification also presents a multiplexing pipelet as a process 232 comprising two inputs 234 (html chunks and pdf chunks) and a single output 236 (result), thereby consolidating two branches of the pipeline into a single, unified pipeline. It should also be noted the exemplary pipeline specification 200 allows for the provision of a parameter tag 228, which identifies one or more parameters 230 for the controller to pass as arguments to a given pipelet.

Figure 3:
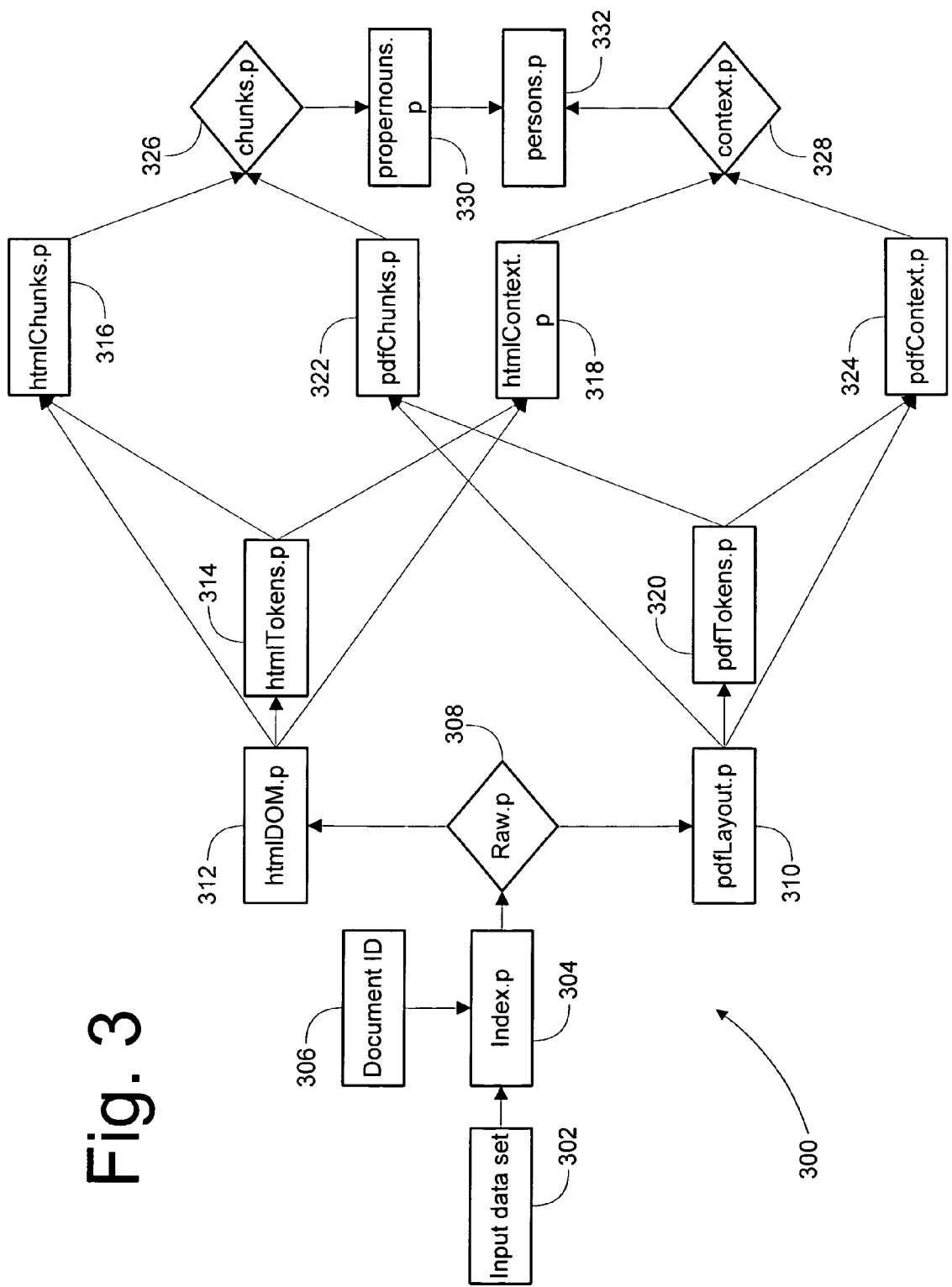
FIG. 3 is a flow diagram illustrating a dependency graph that presents an arrangement of pipelets and the flow of data between the pipelets according to one embodiment of the invention.

FIG. 3 is a flow diagram illustrating a dependency graph that presents an arrangement of pipelets and the flow of data between the pipelets according to one embodiment of the invention. The graphical representation of the pipeline 300 is based on the pipelet dependencies that the pipeline specification of FIGS. 2A and 2B provide. An index pipelet 304 receives an input data set 302 and a document identifier 306. The index pipelet 304 passes its output to a raw pipelet, which demultiplexes the pipeline into two branches on the basis of the current document from the input data set 302.

In this illustration the branching is made on the basis of whether the input data is an HTML or pdf document. The HTML branch of the pipeline 300 includes the pipelets htmlDOM 312, htmlTokens 314, htmlChunks 316 and htmlContext 318. These pipelets determine a DOM for the HTML document 312, tokenize the content of the HTML document 314 and determine chunks or groupings for the tokens 316, in addition to a context for the tokens 318. Similarly, the pdf branch of the pipeline 300 includes the pipelets pdfLayout 310, pdfTokens 320, pdfChunks 322 and pdfContext 324. These pipelets determine a layout for the pdf document 310, tokenize the content of the pdf document 320 and determine chunks or groupings for the tokens 322, in addition to a context for the tokens 324. Both HTML and pdf branches of the pipeline 300 flow into multiplexing pipelets 326 and 328 that consolidate the output data from the respective branches into a common form that non-type specific pipelets 330 and 332 may utilize.

FIG. 3 illustrates the dependencies of all pipelets in the given pipeline 300. When an external entity attempts to exercise the final pipelet 332 in the pipeline 300 as a target, the controller builds this dependency graph in memory to determine the prior pipelets in the pipeline that are required so that the target pipelet is provided with incoming data over its read data interface sufficient to generate the output that the external entity requests. The controller, however, is operative to receive a request targeted towards any given pipelet in the pipeline 300, build the dependency graph from the target to determine the pipelets upon which the target pipelet depends and exercise the required portion of the pipeline. For example, where an external entity provides the controller with a request to target the pdfTokens pipelet 320, the controller builds the dependencies for the target by identifying the pipelets pdfLayout 310, raw 308, index 304 document id 306 and the input data set 302. According to one embodiment, the controller provides for lazy initialization of the pipeline such that only after a request is made to a pipeline does the controller determine the flow of data to the target. At this time, the controller calculates the dependencies and exercises only those pipelets that are required for the target.

Figure 4:
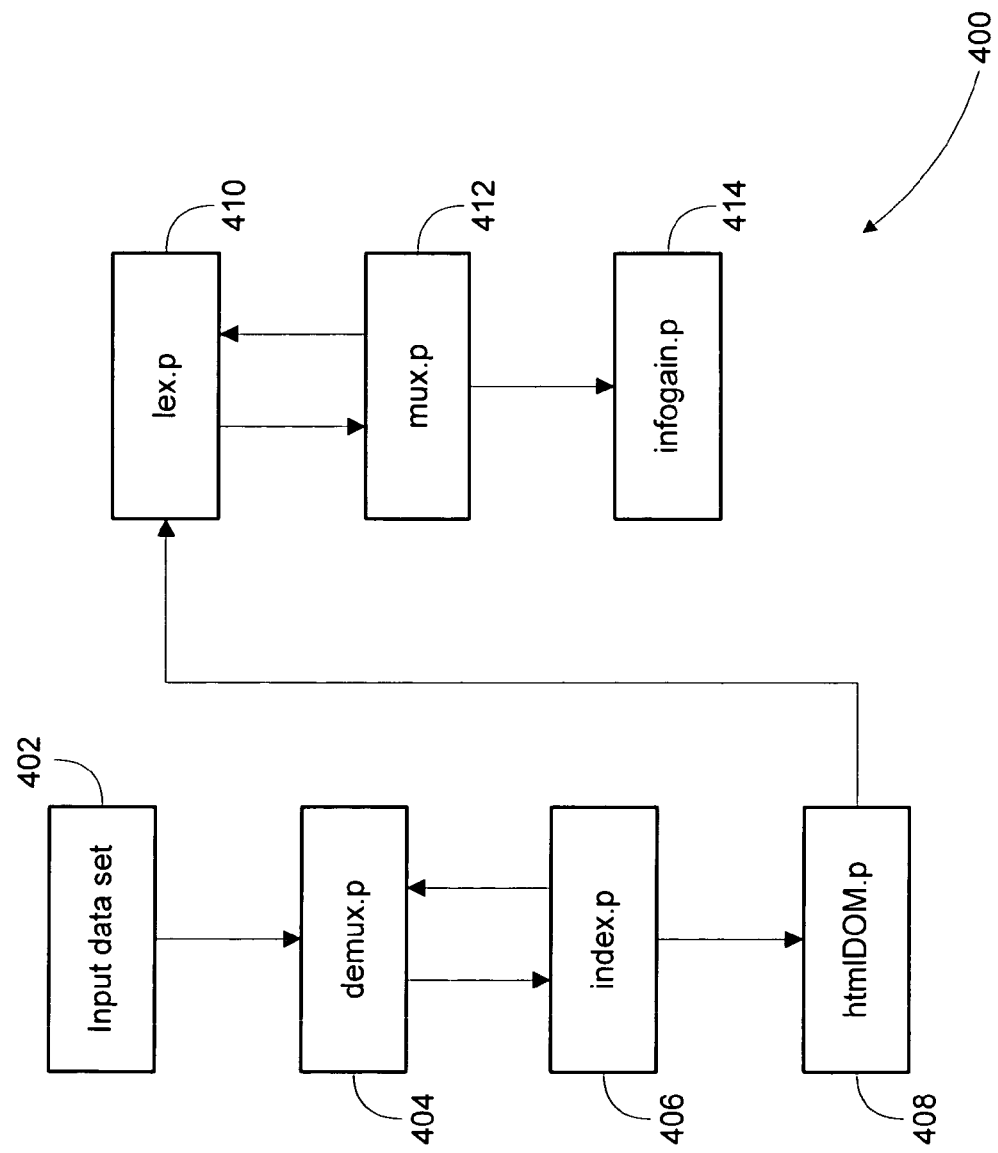
FIG. 4 is a flow diagram illustrating an alternative dependency graph that presents an arrangement of pipelets and the flow of data between the pipelets according to one embodiment of the invention.

In many cases, an external entity makes a request regarding an entire data set or sub-set of data from a larger data set. This requires a pipeline that mixes pipelets operative to process sets and those operative to process single data items, e.g., a document. FIG. 4 illustrates one embodiment of a dependency map that utilizes both multiplex and demultiplex pipelets to split a set up into individual data items and combine the output to create an aggregate output across all data items in the set. Advantageously, the pipeline 400 is similar to pipelines that deal with individual data items and provides divisions that the controller may use to parallelize execution of the pipelets in the pipeline 400.

In order to divide a set of input data items into individual data items in a demux pipelet 404, the declaration for the pipelet 404 provides an unknown number of outputs that refer to individual data items. To support this functionality, the pipeline specification that corresponds to the dependency map for the pipeline 400 according to one embodiment utilizes wildcard outputs whereby each output represents an array output with the same name. The output may then be matched with a similarly named input target without the wildcard character. Similarly, in a mux pipelet 412 the wildcard associations are reversed. The controller is responsible for routing the multiple inputs to the single output and vice versa.

In the present exemplary dependency map of a pipeline 400, a demux pipelet 404 receives an input data set 402 and the controller routes all outputs with a given wildcard enabled label, e.g., "docID*" where the "*" character represents the wildcard, from the demux pipelet 404 to a single input to an index pipelet 406. Processing continues on single data items according to the business logs in htmlDOM 408 and lex 410 pipelets. As the pipelets 406, 408 and 410 analyze individual data items, a mux pipelet 412 directs the output into an aggregate data set for processing by an infogain pipelet 414. By extending a pipeline specification with wildcards, the declaration of the pipeline is obvious and is parallelizable by the controller.

Figure 5:
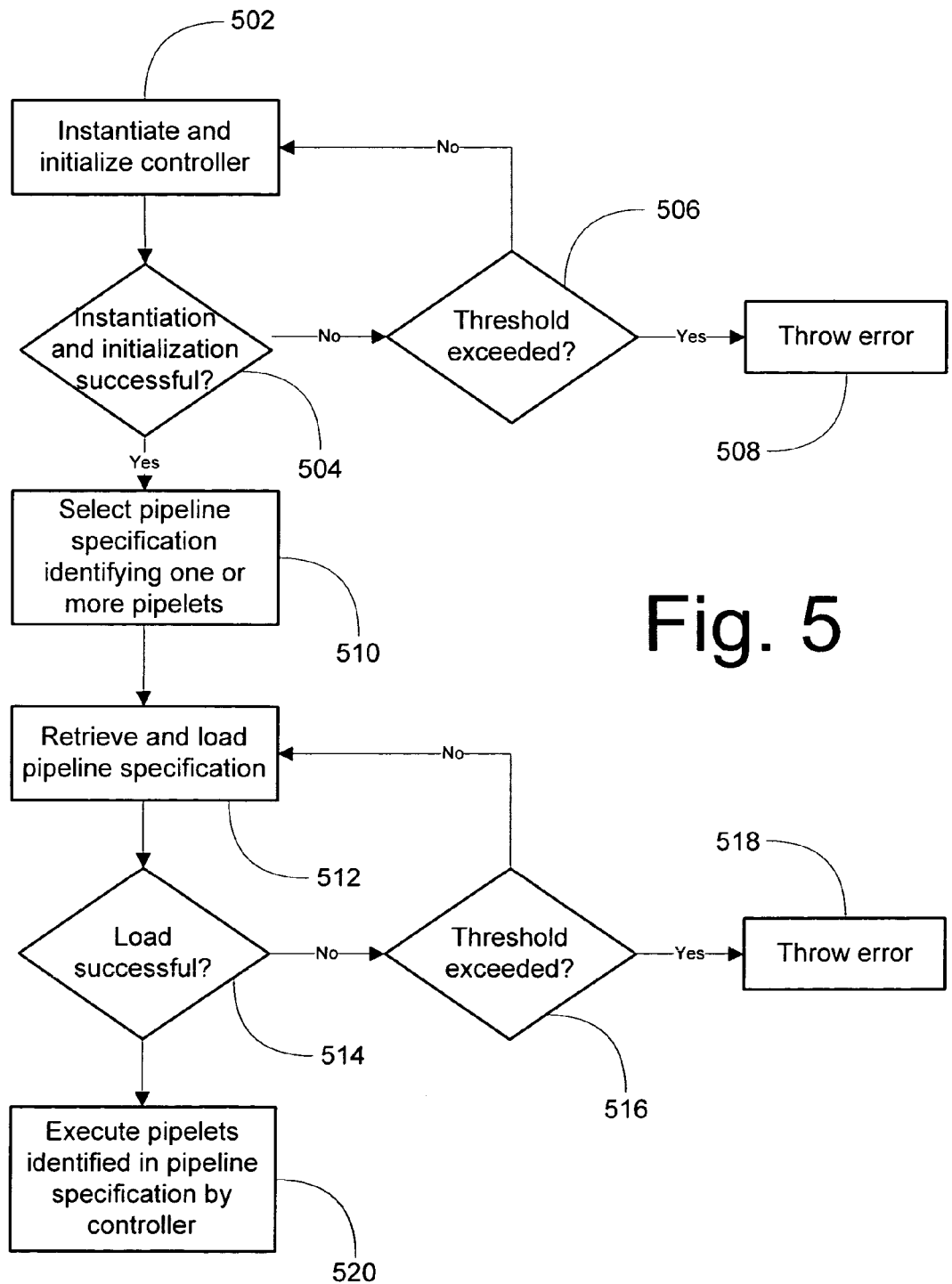
FIG. 5 is a flow diagram illustrating the initialization of a controller to coordinate the execution of one or more pipelets in a given pipeline according to one embodiment of the invention.

One embodiment of a method for initializing a controller and loading a pipeline specification for execution upon receipt of a target request is illustrated at FIG. 5. According to the present embodiment, the method begins with the instantiation and initialization of the controller, step 502. For example, where the controller is written in Java, the controller class may be instantiated as a new controller object. The entity that is instantiating and initializing the controller performs a check to determine if the initialization and instantiation is successful, step 504. Where the check at step 504 evaluates to false, meaning that either the instantiation or initialization of the controller was unsuccessful, a subsequent check is performed to determine if an instantiation and initialization threshold is exceeded, step 506. For example, the system may allow only a certain number of attempts to make a controller available for processing of one or more pipelines. Where the threshold is exceeded, step 506, the system may throw an error, step 508, indicating that instantiation of the controller failed or that the controller failed to properly initialize and is therefore unavailable to process one or more pipelines.

Upon successful instantiation and initialization of the controller, step 502, the controller selects a pipeline specification identifying one or more pipelets, step 510. According to one embodiment, the controller receives a request from an external entity to retrieve the output of a target pipelet such that the controller may use the target request from the external entity to identify a pipelet that fits the target criteria that the external entity provides. The controller attempts to retrieve and load the pipeline specification that it identifies as comprising the target pipelet, step 512, and performs a check to determine if the pipeline specification is properly retrieved and loaded, step 514. Where the retrieval and loading of the pipeline specification is unsuccessful, a subsequent check is performed to determine if a retrieval and load threshold is exceeded, step 516. For example, the system may allow only a certain number of attempts to make a pipeline specification available for processing by the controller. Where the threshold is exceeded, step 516, the system may throw an error, step 518, indicating that the controller was unable to properly retrieve and load the pipeline specification necessary to exercise the target pipelet that the external entity requires.

Where the controller successfully instantiates and initializes, step 504, and the controller properly retrieves and loads a required pipeline specification, step 514, the controller executes the pipelets that the pipeline specification identifies, step 520, according to the data contained therein. According to one embodiment, the controller generates a dependency map to determine the pipelets upon which a given pipelet in the pipeline depends. Alternatively, the controller may utilize information regarding the target pipelet that the external entity is requesting and construct a dependency map on the basis of the target pipelet, which the controller then exercises to provide the resultant output to the external entity.

Figure 6:
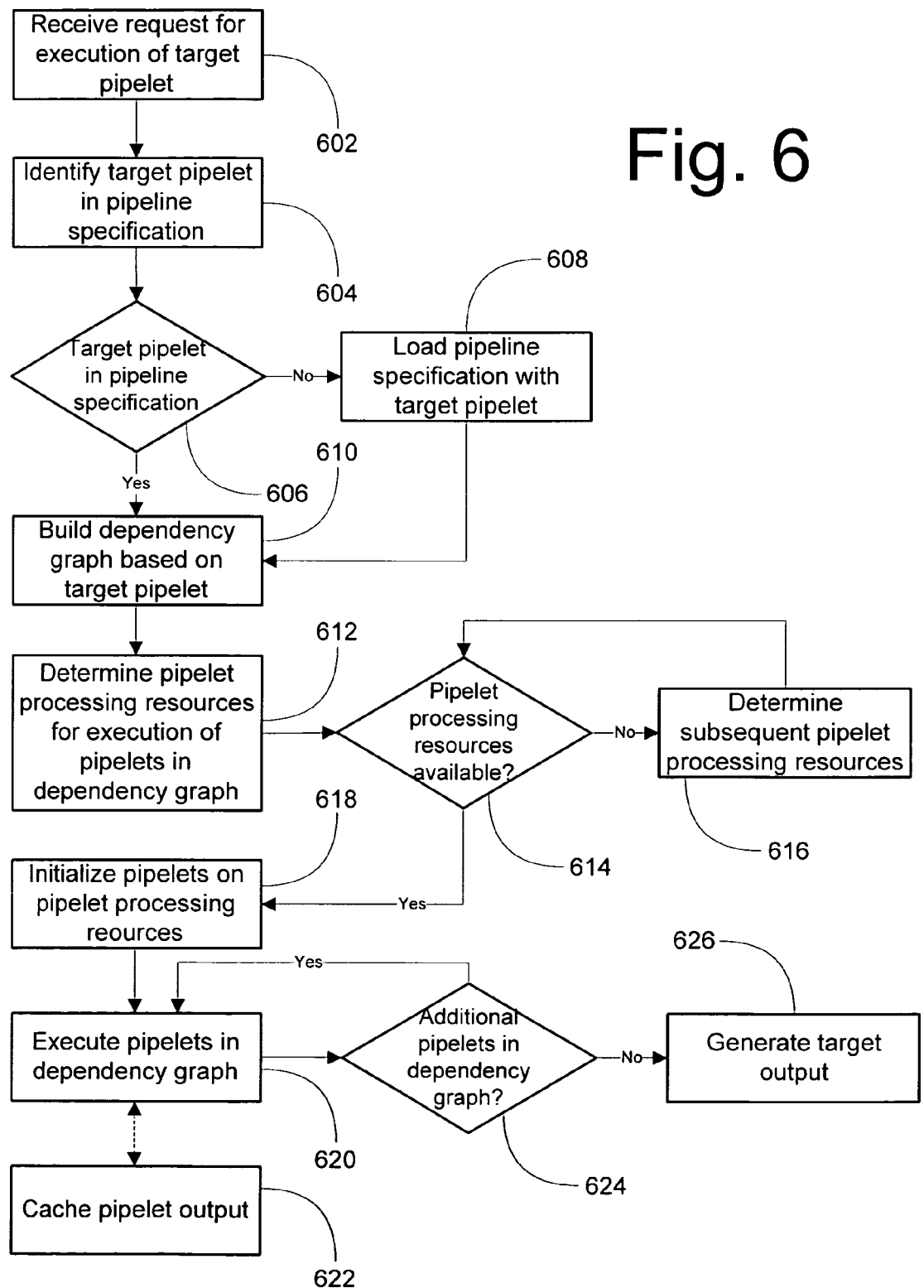
FIG. 6 is a flow diagram illustrating the selection of processing resources and execution of one or more pipelets in a given pipeline according to one embodiment of the invention.

FIG. 6 presents a flow diagram illustrating one embodiment of a method for exercising a pipeline according to one embodiment of the present invention. According to the embodiment illustrated at FIG. 6, the method begins with the receipt of a request for execution of a target pipelet, step 602. The request for execution of the target pipelet, when identifying the final pipelet in a pipeline, may be viewed as a request for execution of the entire pipeline or, alternatively, those pipelets in the pipeline upon which the target pipelet depends. The controller attempts to locate the target pipelet among one or more pipeline specifications loaded into a memory to which the controller has access, step 604. The controller performs a check to determine if the target pipelet is contained within the one or more pipeline specifications, step 606. Where the controller is unable to locate the target pipelet among the one or more pipeline specifications, step 606, the controller attempts to load a pipeline specification comprising the target pipelet, step 608. The controller may access one or more local or remote data sources to locate the required pipeline specification.

Once the controller identifies the pipeline specification that contains the target pipelet, step 604, the controller builds a dependency graph on the basis of the target pipelet, step 610. Accordingly, the controller may determine only those pipelets that are necessary to produce the output from the target pipelet and not unnecessarily consume computing resources by instantiating pipelets in a given pipeline that are not necessary to achieve said output. The controller may also determine the pipelet processing resources to utilize in the execution of the pipelets in the dependency graph, step 612, which may also include determining parallelization such that certain pipelets in the dependency graph my operate in parallel. The controller executes a check to determine whether the determined pipelet processing resources are available for use in exercising the pipelets in the dependency graph, step 614. Where the check at step 614 evaluates to false, e.g., one or more pipelet processing resources are unavailable, the controller determines one or more subsequent pipelet processing resources to utilize in exercising the pipelets in the dependency graph, step 616.

The controller determines one or more pipelet processing resources for use in exercising the pipelets in the dependency graph, steps 612 and 616, and initializes the pipelets on the determined pipelet processing resources, step 618. Initialization may also include instantiation of the pipelets, for example, where the pipelets are Java classes, the controller my instantiate objects on the basis of the one or more pipelet classes in the dependency graph, which may include all pipelets in the pipeline specification that the controller identifies. At step 620, the controller executes the pipelets in the dependency graph using the pipeline processing resources that the controller identifies in steps 612 and 616. As discussed above, according to one embodiment the controller marshals the incoming data to a given pipelet and unmarshals processed incoming data to subsequent pipelets in the dependency graph that depend upon the processed incoming data as input over a read data interface for a given pipelet. The controller may also cache the intermediate output of one or more pipelets in the dependency graph, step 622.

The controller executes a given pipelet in the dependency graph, step 620, and performs a check to determine if additional pipelets exist in the dependency graph that require execution, step 624, e.g., whether there are subsequent or ancestor pipelets in the dependency graph that depend on the output (processed incoming data) of the given pipelet. Where additional pipelets exist that require processing, program flow returns to step 620 at which point the controller executes the pipelet that depends on the output of the given pipelet. When the controller completes the execution of the pipelets in the dependency graph, step 624, the controller provides the output of the target pipelet to the external entity from which the controller received the target request, step 626.

Figure 7:
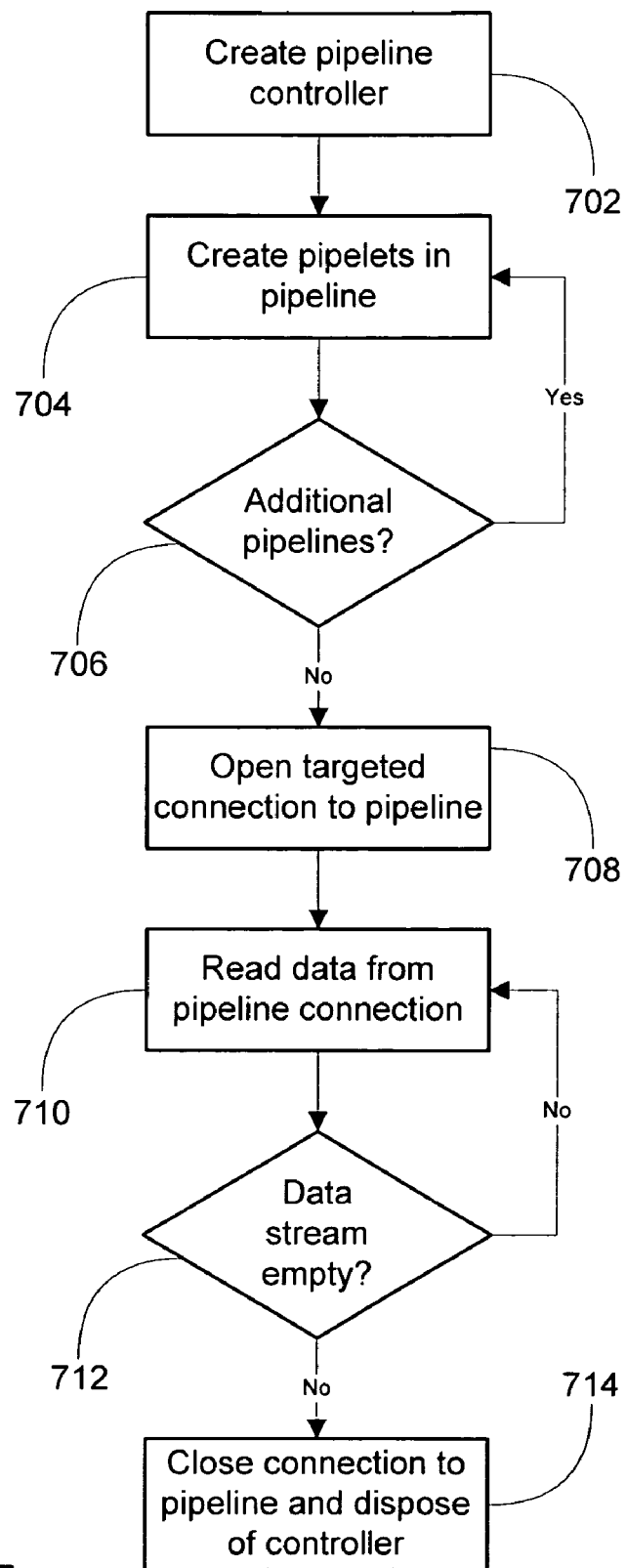
FIG. 7 is a flow diagram illustrating the integration of a pipelet processing framework with an external application according to one embodiment of the present invention.

A controller and the accompanying pipeline processing functionality may be integrated with other software to provide for the pipeline processing of data within applications, services, processes, etc. FIG. 7 illustrates one embodiment of a method for integrating a controller and pipeline processing functionality. The integration method begins with the creation or instantiation of a controller, step 702. Where the controller is coded as a Java class, the integrating application may make a call to the class for the controller to instantiate a new controller object. According to embodiments of the invention, the controller may be instantiated with or without a configuration file, the difference being the amount of data that the integrating application must pass into the constructor for the controller class.

The integrating application also creates one or more pipelets from one or more pipelines for the controller to exercise in the completion of a task, step 704. A given pipeline is created, step 704, and a check is performed to determine if additional pipelines require instantiation, step 706. According to one embodiment, the instantiated pipelines are provided a context for the controller to which the pipelines belongs and the controller starts up after all the pipelines have been created, step 706. The controller starts up and the integrating application opens a targeted connection to a given pipeline from among the one or more pipelines, step 708. The target may be any pipelet in the one or more pipelines that is an output of the one or more pipelines added to the controller, which may be identified by a URL associated with the output of a given pipelet. The integrating application may also set any necessary runtime parameters and create a session that allows the integrating application to read any attributes that are set during the connection, as well as allowing for the reuse of the session if necessary.

The controller begins execution of the one or more pipelines on the basis of the targeted connection that the integrating application opens, step 708, and reads data from the connection to the pipeline, step 710. According to various embodiments of the invention, data may be read from the connection to the pipeline as one or more of a byte stream, a character stream or an object stream. Regardless of how the integrating application reads data from the pipeline, the integrating application periodically checks to determine if the data stream from the pipeline is empty, step 712, indicating that the processing by the pipeline is complete. The integrating application continues to read data from the pipeline connection, step 710, while the data stream is not empty, step 712. When the one or more pipelines associated with the controller complete their one or more processing tasks (all pipelets in the one or more pipelines have completed execution), step 712, the integrating application closes the connection to the pipeline, shuts down the controller and disposes of both the one or more pipelines and the controller, step 714.

FIGS. 1-7 are conceptual illustrations allowing for an explanation of the present invention. It should be understood that various aspects of the embodiments of the present invention could be implemented in hardware, firmware, software, or a combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A system for electronically processing one or more sets of data, the system comprising:
    a processor; and
    a memory having executable instructions stored thereon that when executed by the processor cause the processor to:
    receive a request for an output from a given pipelet belonging to a pipeline, the given pipelet comprising a read data interface operative to receive incoming data, one or more functions for processing the incoming data, and a write data interface operative to make the processed incoming data available as output data to be further processed;
    load a pipeline specification that identifies one or more pipelets, one or more demultiplexing pipelets and one or more multiplexing pipelets belonging to the pipeline including the given pipelet, and that defines the interconnection between the one or more pipelets, demultiplexing pipelets, multiplexing pipelets, and the given pipelet;
    automatically generate a dependency map, based on the pipeline specification, to identify at least one of the one or more pipelets, the one or more demultiplexing pipelets and the one or more multiplexing pipelets of which the given pipelet is dependent on, and determine an execution order of the identified one or more pipelets, demultiplexing pipelets and multiplexing pipelets to obtain the requested output from the given pipelet; and
    execute the identified one or more pipelets, demultiplexing pipelets, multiplexing pipelets and the given pipelet according to the dependency map to provide the requested output from the given pipelet;
    the one or more demultiplexing pipelets comprising a plurality of demultiplexing input and demultiplexing output tags, the plurality of demultiplexing input and demultiplexing output tags each comprising name and label attributes; and
    the one or more multiplexing pipelets comprising a plurality of multiplexing input tags and a multiplexing output tag, the multiplexing input tags and the multiplexing output tag each comprising name and label attributes.

2. The system of claim 1 wherein the given pipelet asynchronously processes incoming data.

3. The system of claim 1 wherein the one or more pipelets are organized according to the pipeline.

4. The system of claim 3 wherein the given pipelet is operative to solve a given step in the pipeline.

5. The system of claim 3 wherein the given pipelet is operative to provide processed incoming data to a plurality of subsequent pipelets.

6. The system of claim 5 wherein a given one of the plurality of subsequent pipelets is operative to provide the processed incoming data to the given pipelet.

7. The system of claim 1 wherein the one or more pipelets process the incoming data in parallel.

8. The system of claim 6 wherein a processing speed of the given pipelet is limited by a rate at which the incoming data is received by the read data interface of the given pipelet.

9. The system of claim 1 wherein the given pipelet is a service invoked by one or more external applications.

10. The system of claim 9 wherein the one or more external applications are one or more web services.

11. The system of claim 1 wherein the one or more pipelets are distributed across one or more pipelet processing resources in communication with a controller over a network.

12. The system of claim 11 wherein the controller determines an appropriate pipelet processing resource at which to execute the given pipelet.

13. The system of claim 1 wherein the given pipelet is identified by an address.

14. The system of claim 13 wherein the address is a Uniform Resource Locator ("URL").

15. The system of claim 13 wherein the address is a Uniform Resource Identifier ("URI").

16. The system of claim 1 wherein a controller is operative to cache the processed incoming data from the given pipelet.

17. The system of claim 1 wherein a controller is operative to select the given pipelet at which to being processing of the pipeline.

18. The system of claim 1 wherein the given pipelet is included as part of a first pipeline and a second pipeline.

19. The system of claim 1 wherein the pipeline is operative to perform focused crawling over a corpus of documents.

20. The system of claim 1 wherein the pipeline is operative to perform machine learning based on a corpus of documents.

21. The system of claim 1 wherein the read data interface is identified by an address.

22. The system of claim 21 wherein the address is a Uniform Resource Locator ("URL").

23. The system of claim 1 wherein the write data interface is identified by an address.

24. The system of claim 23 wherein the address is a Uniform Resource Locator ("URL").

25. The system of claim 1 comprising a persistence processor to store the processed incoming data from one or more pipelets.

* * * * *